United States Patent Office 3,268,575
Patented August 23, 1966

3,268,575
PURIFICATION OF BIS-BETA-HYDROXYETHYL TEREPHTHALATE
Max H. Keck, Cuyahoga Falls, Ohio, assignor to The Goodyear Tire & Rubber Company, Akron, Ohio, a corporation of Ohio
No Drawing. Filed July 5, 1963, Ser. No. 293,180
6 Claims. (Cl. 260—475)

This invention relates to bis beta hydroxyethyl terephthalate, and more particularly is concerned with a process for the purification of bis beta hydroxyethyl terephthalate.

Bis beta hydroxyethyl terephthalate is an intermediate for the preparation of polyesters used in synthetic films and fibers. It is polymerized under relatively high temperature and vacuum to form synthetic linear polyesters. In order to minimize darkening or the development of color in the polyesters formed under such conditions it is necessary that the bis beta hydroxyethyl terephthalate be free of impurities.

Bis beta hydroxyethyl terephthalate can be prepared by several different methods. For example, the ester can be prepared by the direct reaction of ethylene glycol with terephthalic acid. Another method for the preparation of the ester is by the reaction of dimethyl terephthalate with ethylene glycol under ester interchange conditions in the presence of an ester interchange catalyst. Bis beta hydroxyethyl terephthalate can also be prepared by reacting the disodium salt of terephthalic acid with ethylene chlorohydrin. Another method, and perhaps the most economical and practical method for the preparation of bis beta hydroxyethyl terephthalate, is the method in which an aqueous suspension of terephthalic acid is reacted with ethylene oxide in the presence of an alkaline catalyst. In all of these processes the bis ester prepared contains some of the reactants and/or impurities which are formed by incomplete reaction of the reactants or which are formed by side reactions. For example, in the process in which the bis beta hydroxyethyl ester is formed by the reaction of terephthalic acid with ethylene oxide the product is contaminated with unreacted terephthalic acid, some salts of terephthalic acid, low molecular weight polymeric ethylene glycol and the mono beta hydroxyethyl ester of terephthalic acid.

It is an object of this invention to provide a method for the purification of bis beta hydroxyethyl terephthalate. It is another object of the invention to provide a bis beta hydroxyethyl terephthalate which can be polymerized to form a high molecular weight polymer having little or no color or discoloration.

The practice of the invention is illustrated by the following example: Crude bis beta hydroxyethyl terephthalate prepared by the reaction of ethylene oxide with terephthalic acid in aqueous suspension in the presence of an alkaline catalyst and containing at least some of the impurities listed above was dissolved in from three to five times its weight of hexyl alcohol at a temperature of from 100 to 150° C. The resulting solution was filtered while still hot to remove the insoluble half-ester, mono beta hydroxyethyl terephthalate, and other impurities. The solution was allowed to cool. Bis beta hydroxyethyl terephthalate crystallized. The crystals were filtered from the solvent and washed with fresh solvent to remove any impurities remaining on the surface of the crystals. The product was then dried when it was ready for use in the preparation of polyesters.

The above method can be modified when the bis glycol ester appears to be unusually dark or high in color to provide for treatment of the solution of the bis beta hydroxyethyl ester with activated charcoal to remove color. This is accomplished by treating the hot solution with from about 1 to about 5 percent by weight of decolorizing charcoal, based on the weight of bis beta hydroxyethyl terephthalate, and then filtering to remove the charcoal. The clear solution is then cooled and bis beta hydroxyethyl terephthalate crystallizes. The crystals are removed from the solution by filtration, washed and dried.

The improvement in polymer color obtained by purifying bis beta hydroxyethyl terephthalate prepared by the reaction of terephthalic acid with ethylene oxide by crystallizing it from hexyl alcohol as compared with the method in which the bis ester was purified from water is clearly shown by comparing the color of polymer produced in each case using bis beta hydroxyethyl terephthalate purified by the different methods. The polymers listed in Table I were prepared as follows:

EXAMPLE

A mixture of 40 grams of bis beta hydroxyethyl terephthalate, 0.009 gram of zinc acetate, and 0.009 gram of antimony trioxide was heated at 197° C. for 30 minutes under nitrogen atmosphere. The temperature of the mixture was then raised to 244° C. and held there for 15 minutes. The temperature was maintained at 244° C. while the pressure was reduced from atmospheric pressure to 0.03 millimeters of mercury pressure over a period of 15 minutes. The temperature was then raised to 280° C. and maintained at this level for 45 minutes under a pressure of 0.03 millimeter of mercury pressure. A very viscous, clear light-colored polymer was obtained. The polymer color was rated 0.5 on a color comparison scale. The intrinsic viscosity was 0.881 measured at 30° C. in a 60:40 s-tetrachloroethane:phenol mixture (60 parts by weight of s-tetrachloroethane/40 parts by weight of phenol).

The purification treatment and the color of polymer produced from the bis esters so purified are tabulated in Table I below:

TABLE I

| Bis glycol terephthalate: | Polymer color |
|---|---|
| No purification | 3.00 |
| Crystallized from water | 0.75 |
| Crystallized from hexyl alcohol | 0.25 |
| Crystallized from hexyl alcohol after charcoal treatment of the solution | Below 0.25 |

The invention has been illustrated with respect to the use of hexyl alcohol as the solvent for purifying the bis ester. Other higher aliphatic alcohols can also be used. The term higher aliphatic alcohols is used to mean aliphatic and cycloaliphatic alcohols containing from five to twelve carbon atoms in the molecule. The aliphatic alcohols may be straight chain or branched chain compounds. Representative examples of such alcohols are n-amyl alcohol, n-hexyl alcohol, 2-ethyl-1-butanol, n-heptyl alcohol, n-octyl alcohol, 2-ethyl-1-hexanol, n-nonyl alcohol, decanol, dodecanol and cyclohexanol.

It is obvious that the temperature used in the process will depend on the solubility of the bis ester in the solvent as well as the temperature at which the bis ester crystallizes. In carrying out the process generally the bis hydroxyethyl terephthalate is dissolved in hot solvent. Usually the alcohol solvent used is at about its boiling temperature. After the bis ester has dissolved the solution is cooled, usually to about room temperature, to cause the bis hydroxyethyl terephthalate to crystallize and after it has crystallized sufficiently it is removed from the solvent. When it is desirable to filter the solution before the ester crystallizes to remove insoluble matter or when charcoal is used in the added purification step the filtration is carried out while the solution is hot.

The process is usually carried out at atmospheric pressure. The pressure can be varied, if desired. For example, the bis ester can be dissolved and filtered under pressure using suitable pressure vessels and pressure filters. It is obvious that the operating temperature will be adjusted with the pressure used. The ratio of solvent to bis hydroxyethyl terephthalate can be varied over a wide range. From two to 15 or more parts of solvent based on the bis ester can be used. The amount generally used will be from three to 10 parts of solvent per part of bis hydroxyethyl ester.

While certain representative embodiments and details have been shown for the purpose of illustrating the invention it will be apparent to those skilled in this art that various changes and modifications may be made therein without departing from the scope of the invention.

What I claim is:

1. The process which comprises dissolving crude bis beta hydroxyethyl terephthalate in a hot solvent selected from alcohols containing from 5 to 12 carbon atoms from the group consisting of aliphatic alcohols and cycloaliphatic alcohols, filtering the solution and then cooling and allowing the bis beta hydroxyethyl terephthalate to crystallize and removing it from the solvent.

2. The process of claim 1 in which the bis beta hydroxyethyl terephthalate is dissolved in at least three times its weight of the solvent at refluxing temperature and then the solvent is cooled and the bis beta hydroxyethyl terephthalate allowed to crystallize.

3. The process of claim 1 in which the solvent used is n-hexyl alcohol.

4. The process of claim 1 in which the solvent used is 2-ethyl-1-hexanol.

5. The process of claim 1 in which the solvent used is n-nonyl alcohol.

6. The process of claim 1 in which the solvent used is n-amyl alcohol.

References Cited by the Examiner
UNITED STATES PATENTS 2,901,505   8/1959   Kolb _____ 260—475

FOREIGN PATENTS 564,893   10/1958   Canada.
584,679   10/1959   Canada.
586,808   11/1959   Canada.

LORRAINE A. WEINBERGER, *Primary Examiner.*

RICHARD K. JACKSON, *Examiner.*

S. B. WILLIAMS, *Assistant Examiner.*